(12) United States Patent
O'Donnell et al.

(10) Patent No.: US 6,181,985 B1
(45) Date of Patent: Jan. 30, 2001

(54) RATE-BASED LOAD SHED MODULE

(75) Inventors: John J. O'Donnell, Inkster; Alan W. Richards, Fair Haven, both of MI (US)

(73) Assignee: The Detroit Edison Company, Detroit, MI (US)

( * ) Notice: Under 35 U.S.C. 154(b), the term of this patent shall be extended for 0 days.

(21) Appl. No.: 09/069,669

(22) Filed: Apr. 29, 1998

(51) Int. Cl.$^7$ .................................................. G05D 11/00
(52) U.S. Cl. .............................................. 700/295; 700/291
(58) Field of Search .................................... 700/295, 296, 700/297, 298, 291

(56) References Cited

U.S. PATENT DOCUMENTS

| | | |
|---|---|---|
| 4,253,151 | 2/1981 | Bouve . |
| 4,291,375 | 9/1981 | Wolf . |
| 4,315,248 | 2/1982 | Ward . |
| 4,324,987 * | 4/1982 | Sullivan ................................. 307/35 |
| 4,349,879 | 9/1982 | Peddie et al. . |
| 4,350,980 | 9/1982 | Ward . |
| 4,390,876 | 6/1983 | Bjorklund et al. . |
| 4,467,314 * | 8/1984 | Weikel .............................. 340/310 A |
| 4,511,979 | 4/1985 | Amirante . |
| 4,771,185 | 9/1988 | Feron et al. . |
| 4,888,495 | 12/1989 | Feron et al. . |
| 5,430,430 | 7/1995 | Gilbert . |
| 5,519,622 | 5/1996 | Chasek . |
| 5,572,438 | 11/1996 | Ehlers et al. . |
| 5,576,700 * | 11/1996 | Davis ............................... 340/825.16 |
| 5,598,349 * | 1/1997 | Elliason .................................. 702/13 |
| 5,621,654 | 4/1997 | Cohen et al. . |
| 5,644,173 | 7/1997 | Elliason et al. . |
| 5,696,695 * | 12/1997 | Ehlers et al. . |

* cited by examiner

*Primary Examiner*—William Grant
*Assistant Examiner*—Ronald D Hartman, Jr.
(74) *Attorney, Agent, or Firm*—Reising, Ethington, Barnes, Kisselle, Learman & McCulloch, PC

(57) ABSTRACT

A load shed module for use in a power distribution system that includes facility for delivering both electrical power and electrical power rate information from a utility supplier. The load shed module includes an enclosure having a power plug for receipt in a standard utility power outlet such as a wall socket, and a power socket on the enclosure for connection to a power load. A relay switch is disposed within the enclosure for selectively electrically connecting the plug to the socket to deliver electrical power to the load coupled to the socket. A rotary switch is mounted on the enclosure, and rotary rate indicia is provided on the enclosure adjacent to the rotary switch and coordinated with position of the rotary switch for operator selection of a rate tier at which the socket is to be disconnected from the plug. Utility power rate information is received from the utility supplier and compared with the rate tier selected by the operator at the rotary switch. When the power rate information equals or exceeds the selected rate tier, the module socket is disconnected from the plug so that the associated load is effectively disconnected from the power distribution system.

16 Claims, 7 Drawing Sheets

RATE-BASED LOAD SHED MODULE

The present invention is directed to utility power distribution systems, and more particularly to a module that sheds or disconnects a load coupled thereto based upon rate information from the utility power supplier and operator selection of a load shed threshold.

BACKGROUND AND SUMMARY OF THE INVENTION

It has heretofore been proposed to provide utility power distribution systems with load shedding capability whereby loads may be selectively disconnected from the power system during periods of peak demand. Users may be provided with the option to select the threshold at which the load is to be disconnected from the power grid based upon utility power rate or other criteria. One purpose of such a system is to provide the user with the option of reducing utility costs during periods of peak demand, while at the same time reducing overall load on the power grid.

In load shedding systems heretofore proposed, the operator or user input capability tends to be unduly complex, and difficult for many business and residential customers. Furthermore, many schemes contemplate inclusion of these capabilities at the time of initial system set up, such as when a home or business facility is constructed, and are not well adapted for use in connection with existing systems and buildings. It is therefore a general object of the present invention to provide a load shed module that is well adapted for use in conjunction with existing buildings and power distribution systems, and that is inexpensive to implement. Another and related object of the present invention is to provide a load shed module of the described character in which the operator may readily select a desired load shed threshold, based upon electrical power rate information received from the utility supplier, without technically complex threshold selection input means. A further object of the present invention is to provide a load shed module of the described character that includes voltage, current phase angle and power monitoring capability, and that is adapted to transmit energy consumption and status information to the utility power supplier. Yet another object of the invention is to provide a load shed module of the described character that is adapted to respond to control signals from the utility power supplier to shed or disconnect the associated load independent of the load shed threshold selected by the user.

A load shed module is provided in accordance with a presently preferred embodiment of the invention for use in a power distribution system that includes facility for delivering both electrical power and electrical power rate information from a utility supplier. The load shed module includes first connection capability to receive utility power and second connection capability for connection to a power load. An electrical switch such as a relay selectively electrically connects the first connector to the second connector to deliver electrical power to the load coupled to the second connector. A rotary switch is provided, and rate tier indicia is provided adjacent to the rotary switch and coordinated with position of the rotary switch for operator selection of a rate tier at which the second connection is to be disconnected from the first connector. Utility power rate information is received from the utility supplier and compared with the rate tier selected by the operator at the rotary switch. When the power rate information equals or exceeds the selected rate tier, the module second connector is disconnected from the first connector so that the associated load is effectively disconnected from the power distribution system.

In the presently preferred embodiment of the invention, which is specifically adapted for use in existing buildings, the module includes an enclosure on which the rotary switch and rate tier indicia are mounted. The first connector comprises a power plug that extends from the enclosure for receipt in a standard utility power outlet such as a wall socket, and the second connector comprises a power socket on the enclosure for receipt of a load power plug. The plug and socket are of standard configuration associated with power level—e.g., 120 VAC or 240 VAC. Alternatively, the module may be provided on a circuitboard or within an enclosure for placement on or within a wall adjacent to a building junction box, with leads extending for connection to power and load. The module may be employed for selective connection or disconnection of an entire circuit at the junction box. As another alternative, the module may be configured for placement in the wall, either at the time of building construction or as an aftermarket installation, in place of a conventional wall outlet.

In the preferred embodiment of the invention, the rate tier indicia and associated rotary switch positions are associated with a plurality of differing rate tiers, and one position of the rotary switch and the associated indicia are associated with continuous connection of the second connector to the first connector independent of power rate information. The power rate information in the preferred embodiment of the invention is received over the utility power lines using power line carrier or other suitable technology. As the rate information exceeds or falls below the tier threshold selected by the operator, the load is selectively disconnected or connected to the power system at random intervals to prevent massive connection or disconnection of loads from the power grid as the rate information fluctuates.

In accordance with another important aspect of the invention, voltage available from the power grid is continuously monitored, and the load is selectively disconnected from the power grid when available voltage is less than or greater than thresholds that might cause damage to the load. Voltage, current and phase angle are all monitored for calculating power and energy consumption. Energy consumption information and status information may be selectively transmitted from the module to the utility power supplier. The module in accordance with the present invention also monitors the quality of available power, and transmits appropriate information to the utility supplier.

BRIEF DESCRIPTION OF THE DRAWINGS

The invention, together with additional objects, features and advantages thereof, will be best understood from the following description, the appended claims and the accompanying drawings in which:

DETAILED DESCRIPTION OF PREFERRED EMBODIMENTS

Figure 1:
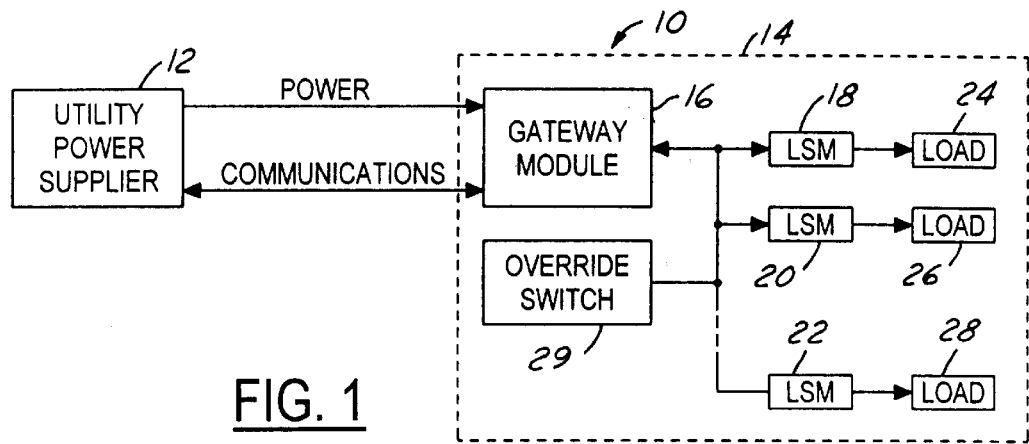
FIG. 1 is a block diagram that illustrates a power distribution system in accordance with a presently preferred implementation of the invention.
Figure 4D:
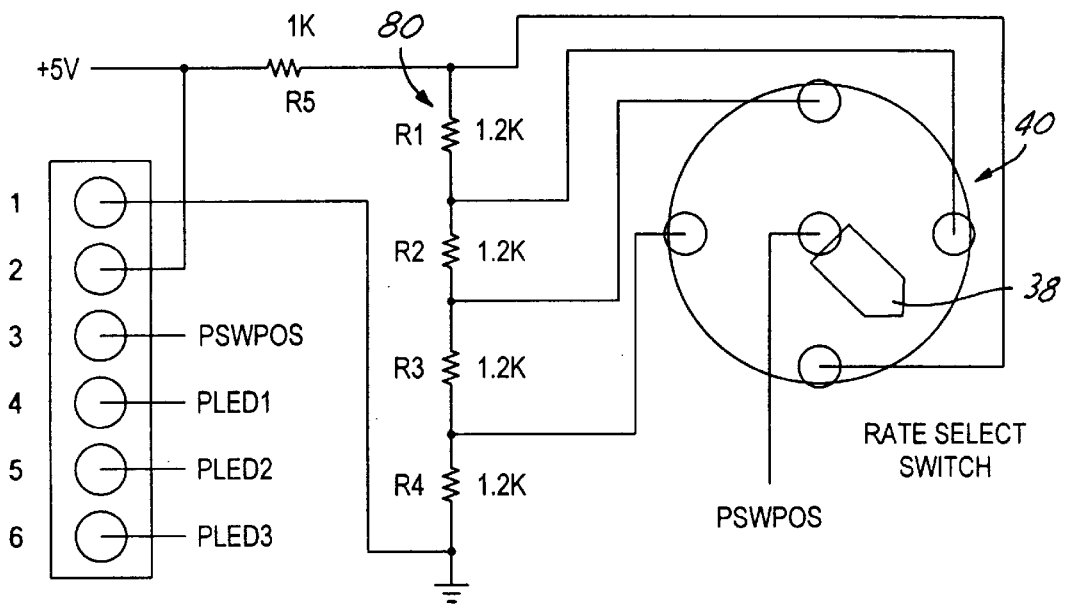
FIGS. 4A, 4B, 4C and 4D together comprise an electrical schematic diagram of the load shed module illustrated in FIGS. 2 and 3.
Figure 4D:
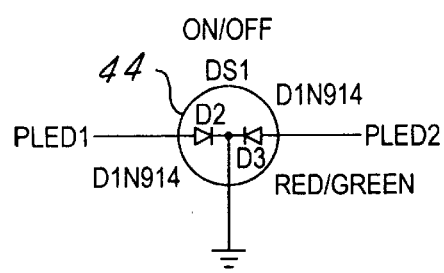

FIG. 1 illustrates a power distribution system 10 as including a utility power supplier 12 that feeds utility power to a multiplicity of user buildings 14. Building 14 may comprise a business or residential building. A gateway module 16 is disposed within building 14 for receiving utility power from supplier 12, and for bi-directional communication with the utility power supplier. Such bidirectional communication may be by any suitable conventional technique. The currently preferred embodiment of the invention implements bi-directional communication with the utility power supplier employing conventional hybrid fiber coax technology. Gateway module 16 provides both power and rate information to a plurality of load shed modules 18, 20, 22. In the preferred embodiment of the invention, this is accomplished employing conventional power line carrier technology. Alternatively, but still within the scope of the invention, this communication may be accomplished in any other suitable manner, such as by rf communication, twisted pair interconnection, etc. That is, both power and rate information is supplied to modules 18–22 over the utility power lines within building 14. Each load shed module 18, 20, 22 is connected to an associated load 24, 26, 28. Loads 24–28 may comprise, for example, conventional domestic appliances, appliances or equipment employed in business applications, etc. In general, the purpose of gateway module 16 is to communicate with utility power supplier 12 employing hybrid fiber coax or other suitable technology, to communicate power rate tier information to modules 18, 20, 22 employing power line carrier or other suitable technology, and to receive status and usage information from modules 18–22 and transmit such information as required to utility power supplier 12. An override switch 29 is provided in a thermostat, for example, to provide the operator with the capability of connecting all loads to the power distribution system independent of rate tier.

Figure 2:
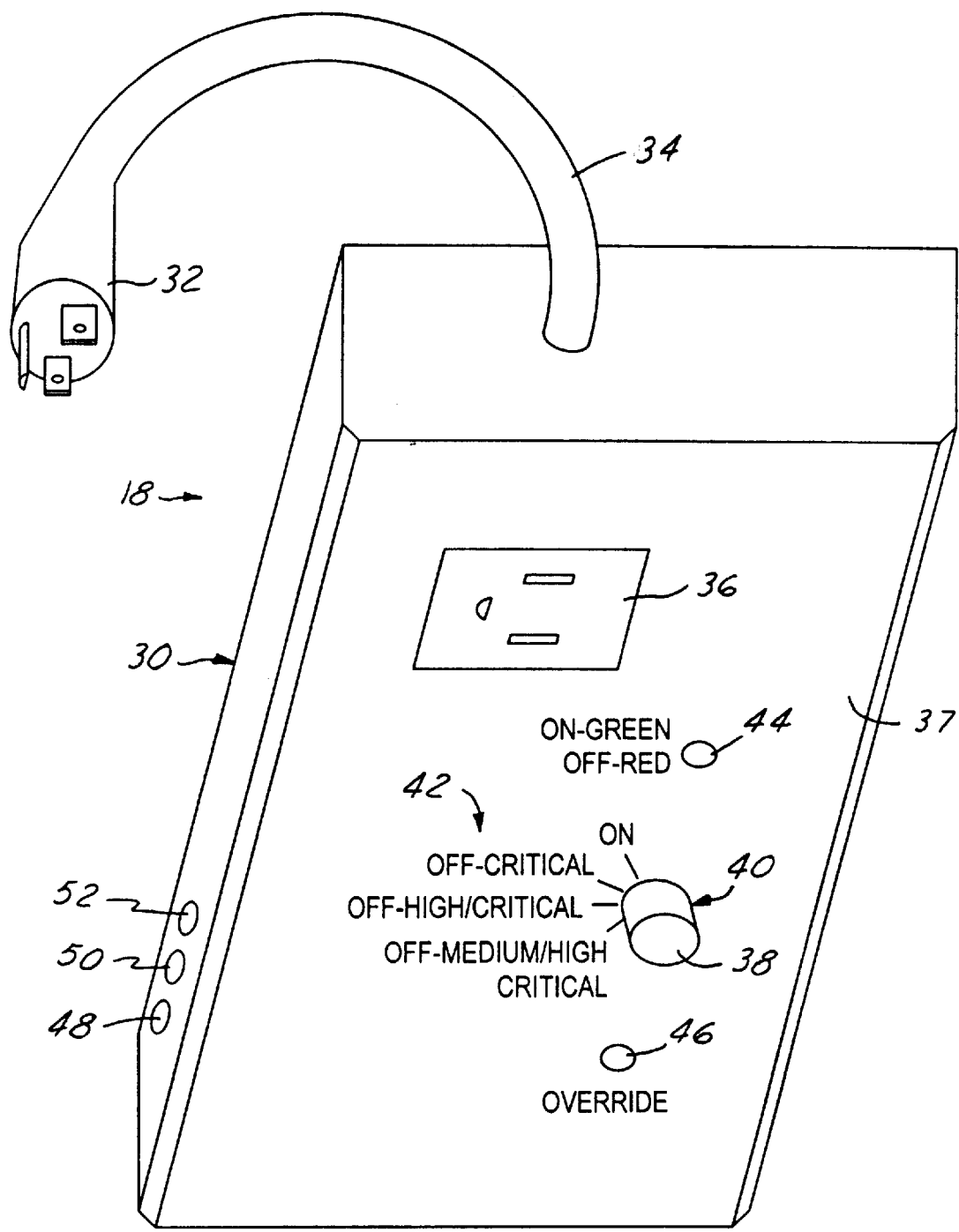
FIG. 2 is a perspective view of a load shed module in accordance with a presently preferred embodiment of the invention.

FIG. 2 illustrates load shed module 18 associated with load 24 in accordance with a presently preferred embodiment of the invention, the other load shed modules being identical thereto. Module 18 includes a rectangular enclosure 30 of metal or plastic construction. A utility plug 32 extends on a cord 34 from one sidewall of enclosure 30. Plug 32 may be of any suitable conventional configuration for receipt in a utility power outlet, such as a conventional wall socket. A power socket 36 is disposed on one face 37 of enclosure 30 for receipt of the power plug of the associated load, such as an appliance power plug for example. The knob 38 of a rotary switch 40 is disposed above face 37 of enclosure 30 adjacent to socket 36. Knob 38 has a pointer or other suitable means associated with position of knob 38 and switch 40. Indicia 42 is printed on enclosure 30 adjacent to knob 38 of switch 40, and is associated with the discrete positions of switch 40 for operator selection of the utility rate tier at which the associated load is to be shed or disconnected from the power system. In the particular embodiment illustrated in FIG. 2, indicia 42 includes an "On" position for continuous connection of the load to the power grid independent of power rate, an "Off-Critical" position for disconnection of the load when the utility price rate reaches a "critical" level, an "Off-High-Critical" position for disconnecting the load when the price rate reaches either a "high" or "critical" level, and an "Off-Medium/High/Critical" position for disconnecting the load from the power grid when the price rate information reaches either a "medium," "high" or "critical" level.

Also on face 37 of enclosure 30 is a bicolor LED 44 for indicating whether the load is connected to (green) or disconnected from (red) the power grid, and an LED 46 for indicating when the user has overridden the tier selection programming of the module and connected the load to the power grid independent of rate. Along a sidewall of enclosure 30 is a "wink" LED 48 for indicating that the module is being "winked" by an external installation tool or controller, an LED 50 useful during service to indicate device status, and pushbutton switch 52 to direct the module 5 to transmit its unique address code to gateway 16.

Within module 18 (and identical modules 20. 22, etc.), plug 32 provides power to a power supply 54 (FIG. 3) for supplying power to the remainder of the module components. Plug 32 is also connected to voltage, current and phase angle measurement electronics 56, 58, 60, and to a relay 62 for selective connection to module socket 36 and associated appliance or load 24. LED 44 is driven by a voltage detector 64 coupled to socket 36. Power supply 54, as well as voltage, current and phase angle measurement electronics 56, 58, 60, are all connected to a microcomputer 66. Microcomputer 66 also receives input information from rate selection rotary switch 40 and service pushbutton 52, and provides control outputs to LEDS 46, 48, 50, and relay 62. Microcomputer 66 is also coupled to a bidirectional power line carrier transmitter/receiver 68 for receiving information from gateway 16, and transmitting status and other information to gateway 16 upon command. Microcomputer 66 is also coupled to a non-volatile memory 70 for selectively storing and transmitting load data, including voltage, current, phase angle, power and energy consumption data, for later transmission to gateway 16 on command.

Figure 3:
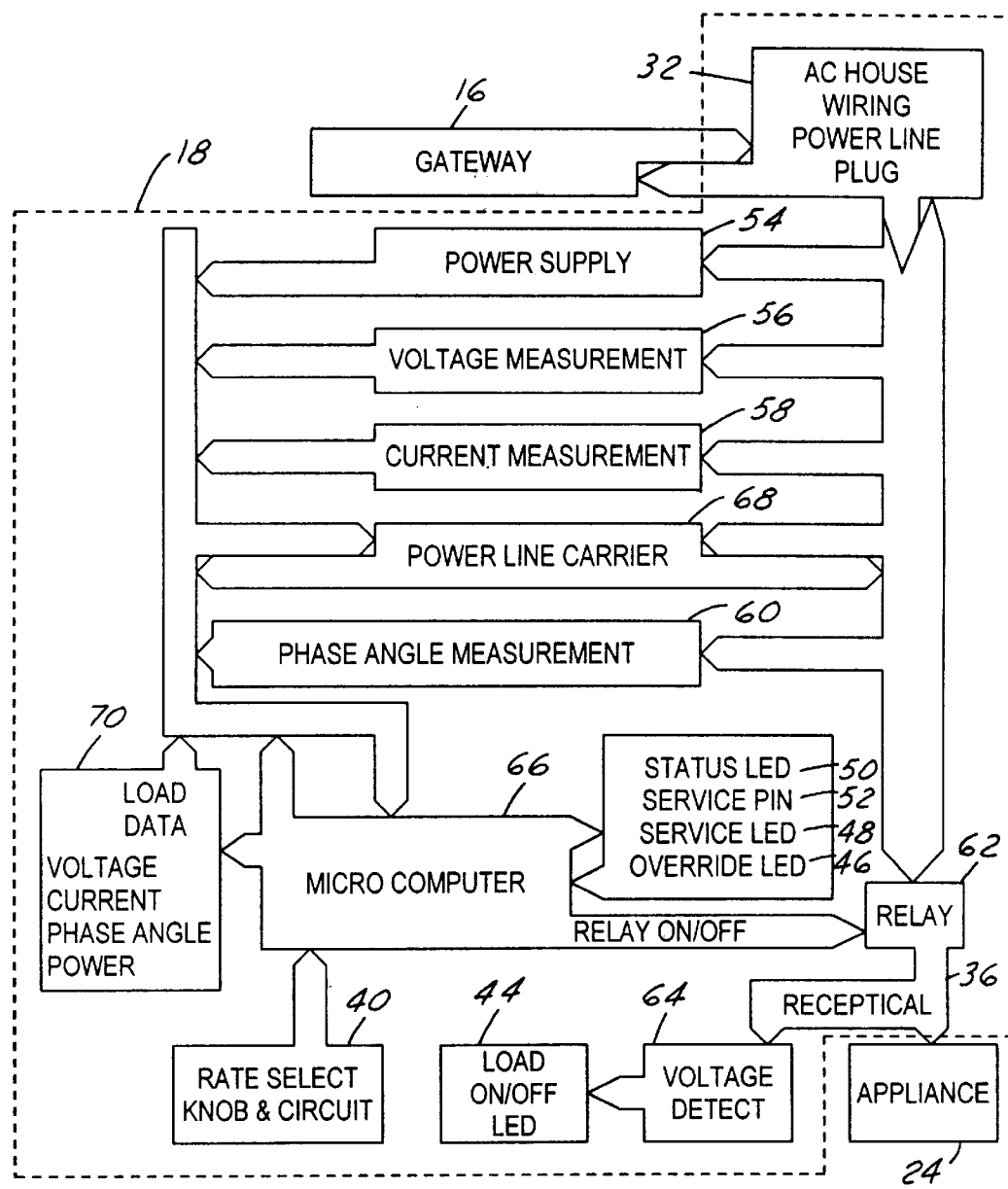
FIG. 3 is a functional block diagram of the load shed module of FIG. 2 in the power distribution system of FIG. 1.
Figure 4A:
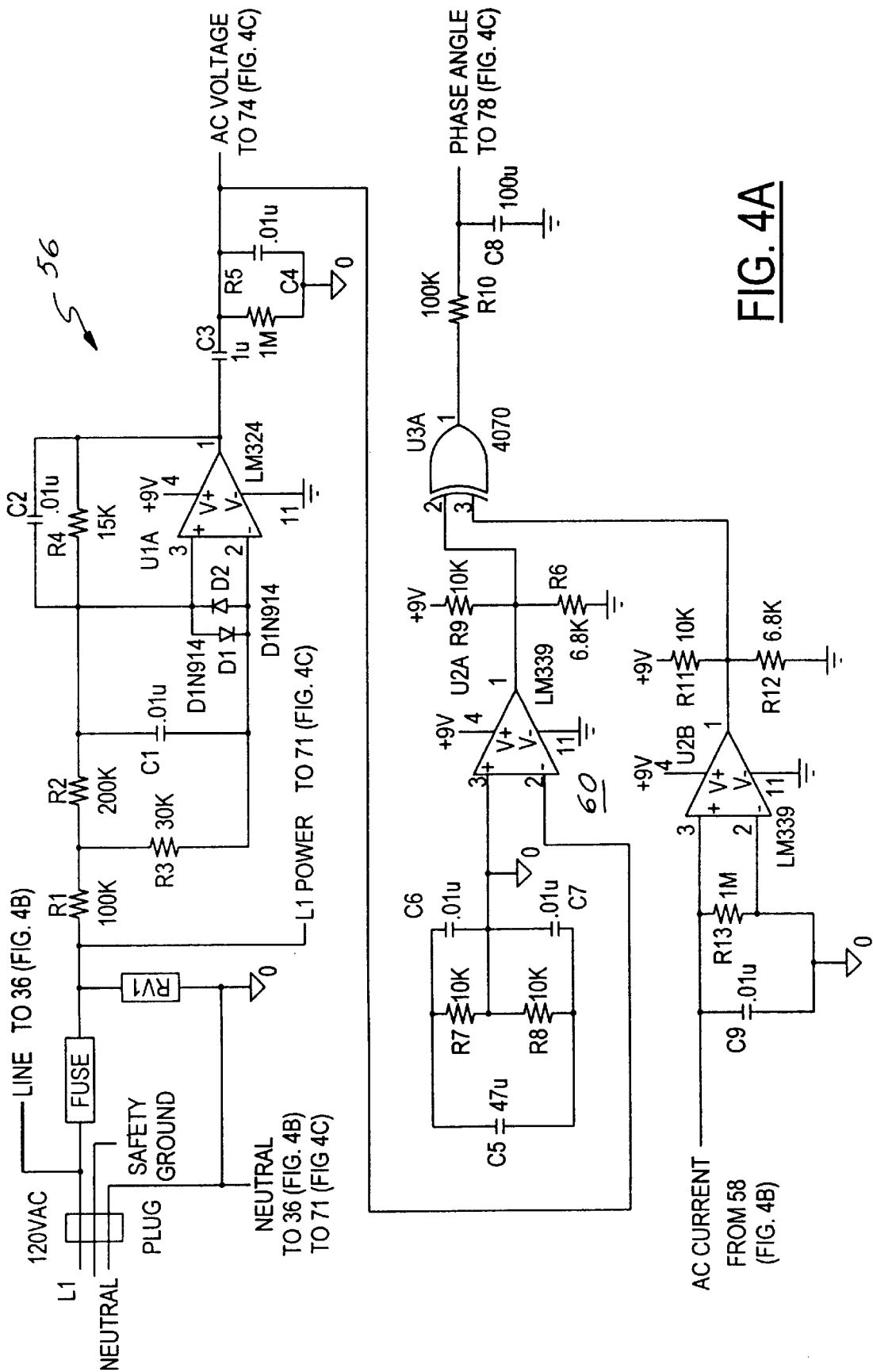
Figure 4B:
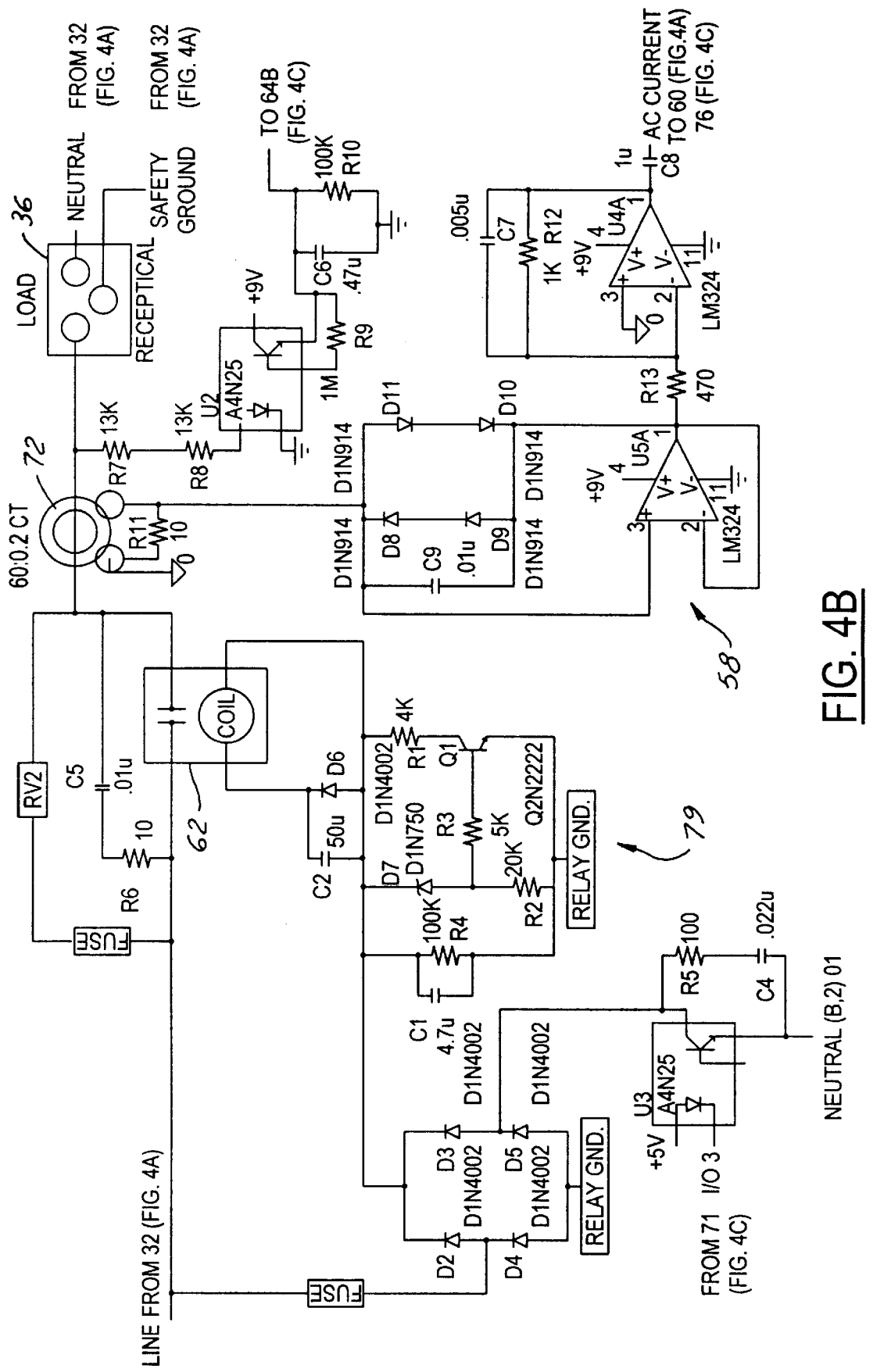
Figure 4C:
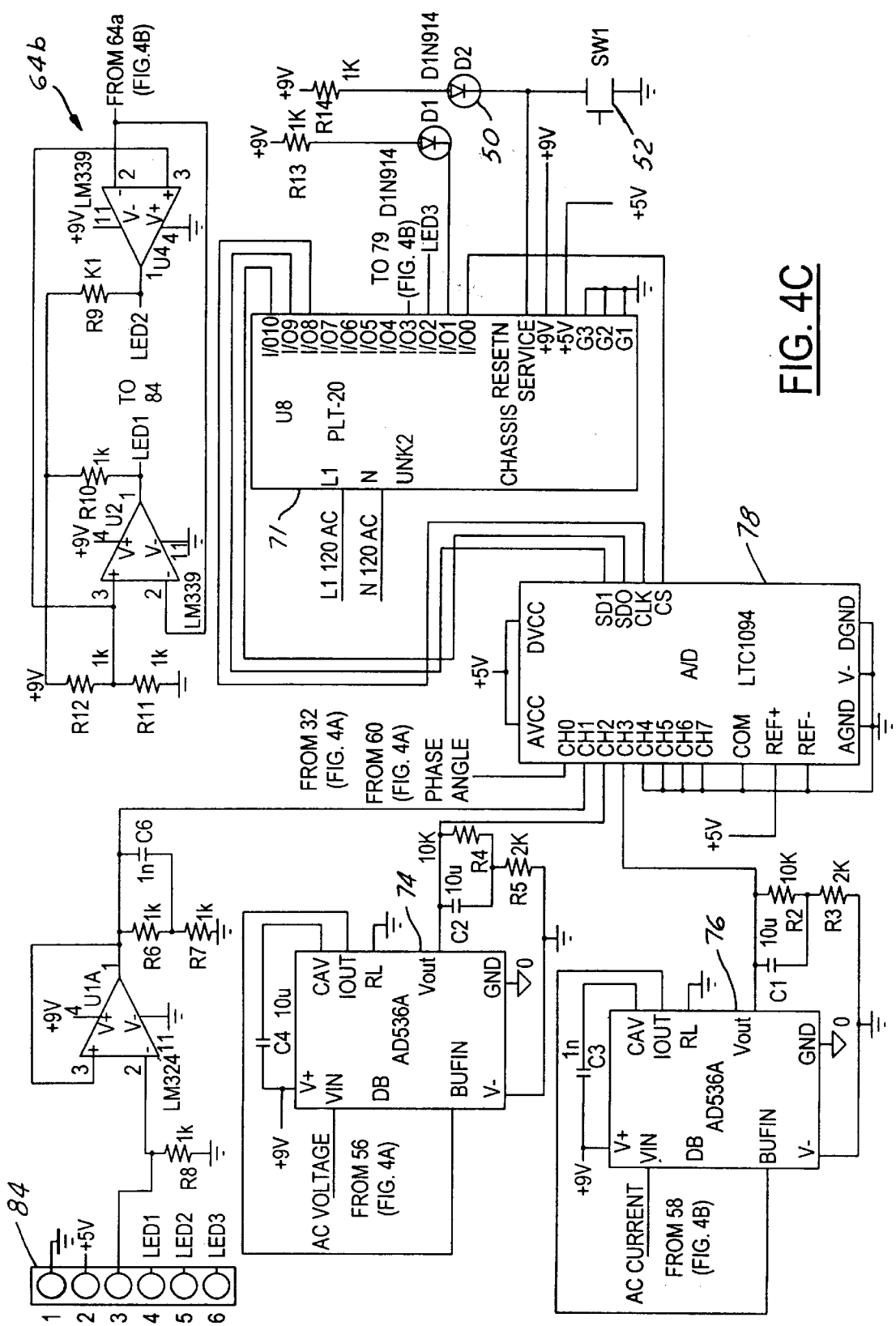

FIGS. 4A–4D together comprise an electrical schematic diagram of load shed module 18 illustrated functionally in FIG. 3. The circuitry illustrated in the functional blocks of FIG. 3 may be related to the detailed circuitry of FIGS. 4A–4D by means of the correspondingly identical reference numerals. Microcomputer 66, power supply 54, transmitter/receiver 68 and memory 70 in FIG. 3 are all contained within a microcomputer module or board 71 in FIG. 4C. The input power lines L1 and N at plug 32 (FIG. 4A) are connected as inputs to module 71 both for delivering power to the power supply and for connection to the transmitter/receiver. Utility power at plug 32 is fed to a filter circuit 56 (FIG. 4A) to provide an a.c. voltage signal for amplitude measurement. The line voltage at plug 32 is also connected through the contacts of relay 62 (FIG. 4B) and a current sensor 72 to output socket 36. The neutral and ground contacts of plug 32 (FIG. 4A) are connected directly to socket 36 (FIG. 4B). Current sensor 72 is coupled to current measurement electronics 58 (FIG. 4B) to provide an a.c. output that accurately reflects the amplitude and phase of current applied to the load. Voltage measurement electronics 56 (FIG. 4A) and current measurement electronics 58 (FIG. 4B) provide associated inputs to RMS converters 74, 76 (FIG. 4C). The voltage and current measurement electronics also to provide inputs to phase angle measurement electronics 60 (FIG. 4A). Voltage detector 64 (64a in FIG. 4B combined with 64b in FIG. 4C) is connected to LED 44 (FIG. 4D) through mating connectors 77, 84. Module 71 provides an input I/O 3 to a relay driver 79 (FIG. 4B) for selectively opening and closing relay 62.

Converters 74, 76 and phase angle measurement electronics 60 provide corresponding inputs to an a/d converter 78 (FIG. 4C). Rate threshold selection rotary switch 40 (FIG. 4D) has contacts connected to a voltage divider 80, which provides output through mating connectors 82, 84 (FIGS. 4D and 4C) to a/d converter 78. Thus, the voltage level to a/d converter 78 from voltage divider 80 is indicative of the position of knob 38 of rotary switch 40. A/D converter 78 provides output to and is controlled by microcomputer 66 for selectively feeding to the microcomputer signals indicative of voltage, current, phase angle and switch position.

Figure 5:
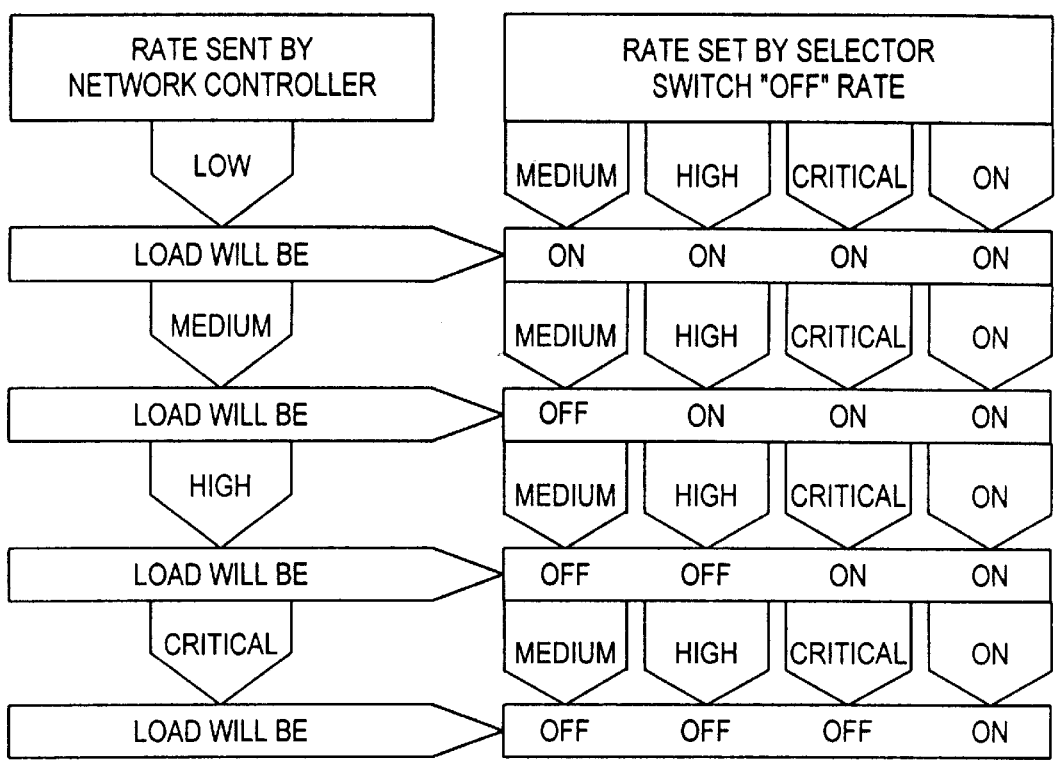
FIG. 5 is a state diagram useful in describing operation of the load shed module.

Operation of the load shedding function of module 18 will be understood from the state diagram of FIG. 5. The left side of FIG. 5 illustrates the rate tier information sent by the utility power supplier to gateway module 16 (FIG. 1) and by module 16 to module 18. The right side of FIG. 5 illustrates the setting of rate tier selector switch 40 by the module user or operator. When the rate information transmitted to the module indicates that the utility rate is "low," plug 32 will be connected to socket 36 independent of switch position. When the transmitted rate information indicates a "medium" rate status, the plug will be disconnected from the socket, and the load will be disconnected from the power grid, if switch 40 is in the "Off-Medium/High/Critical" position. but otherwise will be connected to the power grid. If the transmitted rate information indicates a "high" rate, the load will be disconnected from the power grid if switch 40 is in either the "Off-High/Critical" or "Off-Medium/High/Critical" position. If the rate information indicates a "critical" rate level, the load will be disconnected from the power grid unless switch 40 is in the "ON" position, which connects the load to the power grid independent of rate information.

Figure 6:
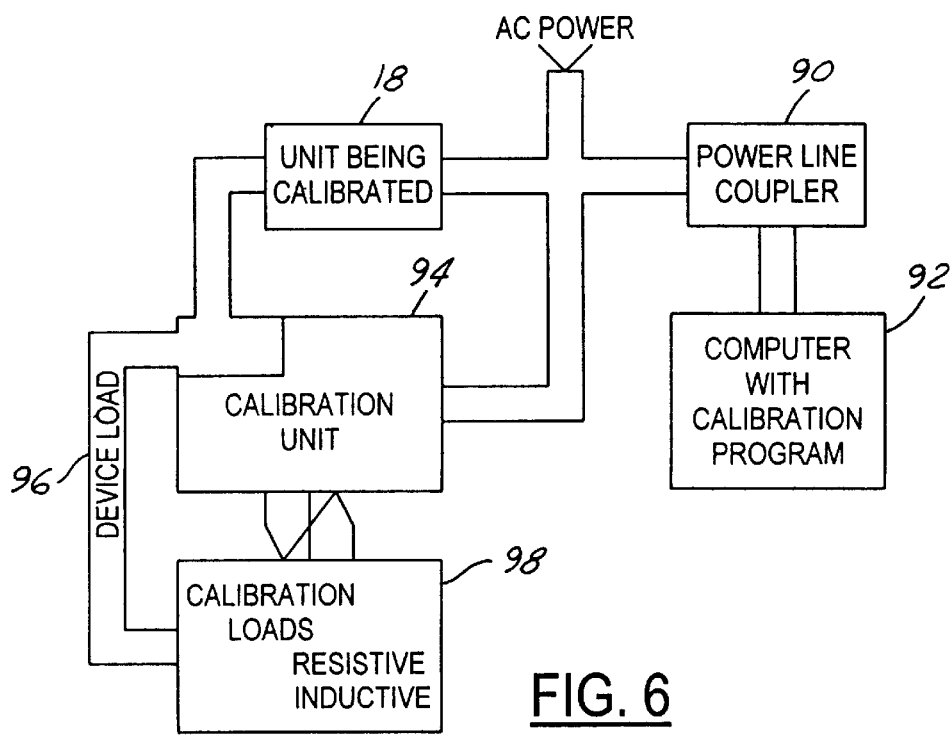
FIG. 6 is a functional block diagram that illustrates the technique for calibrating the load shed module in accordance with the invention.

FIG. 6 illustrates calibration of module 18 (and modules 20, 22, etc.) in accordance with another aspect of the invention. Each load shed module is calibrated for accurate measurement of voltage, current and phase angle to correct for variations between and among load shed modules, and to test each load shed module individually. A module 18 being calibrated has its input plug 32 connected to a coupler 90 for both receiving input a.c. power and for connection to a calibration computer 92. The output socket 36 of the module is connected to a calibration unit 94, which is also connected to the power line to monitor actual power input. Calibration unit 94 is connected through a device load connector 96 to a calibration module 98 for selective connection of various resistive and indicative loads to module 18 under control of calibration unit 94. Computer 92 controls calibration unit 94 selectively to connect various loads to module 18, and monitors the associated voltage, current and phase angle readings at module 18. If these readings are not accurate, appropriate correction factors are downloaded into module 18.

Each module 18, 20, 22, etc. is constructed and programmed to possess a unique selection address code. When the module is initially connected (FIG. 1), pushbutton 52 is depressed to transmit the code to gateway 16. Thereafter, gateway 16 may selectively communicate with this module by transmitting thereto the appropriate address code. Gateway 16 may then command the module to upload status information, and power and energy consumption information, either current or historical stored in memory 70 (FIG. 3). Gateway 16 may also download command and control information, such as the current utility rate.

Microcomputer 66 also monitors power voltage level, and disconnects the board if the power voltage level is below or above the damage level for the load. For a 120 VAC load, these are internally set at 102 volts at 132 volts. For a 240 VAC load, these are set at 204 volts and 264 volts. FIG. 2 illustrates a module 18 for a 120 VAC load, having a 120 VAC plug 32 and socket 136. A module for a 240 VAC load would have a plug and socket of a corresponding different standard configuration. Microcomputer 66 also monitors and reports power quality.

Status information provided by module 18 on command may include: (1) whether an associated load has been shed, and whether due to rate comparison, voltage protection or gateway override, (2) power quality—i.e., whether the input voltage is within present ranges, (3) whether acceptable rate information has been received, (4) whether the internal random timer has been started for load shedding or reconnection, and (5) whether the user has changed the position of switch 40. The module may also selectively upload (6) the setting of switch 40, (7) current power consumption and (8) other status information.

There has thus been disclosed a load shed module for a power control system that fully achieves all of the objects and aims previously set forth. The load may be shed or disconnected from the power grid based upon rate information transmitted from the power supplier and a desired shedding threshold selected by the operator. Voltage is continuously monitored for selectively connecting the load from the power grid if the available voltage is above or below associated thresholds, thereby protecting the load from over-or under-voltage conditions. Power is continuously monitored as a function of voltage, current and phase angle for a more accurate reading of power and energy consumption. Power and/or energy consumption are stored and may be selectively transmitted to the utility as desired. The unit also monitors the quality of available power, for transmitting to the power supplier information indicative of poor power quality.

What is claimed is:

1. A load shed module for use in a power control system that includes means for delivering electrical power from a utility supplier and means for delivering electrical power rate information from the utility supplier, said load shed module comprising:

first means for connection to receive utility power, a power socket for receiving a power plug from a load to apply electrical power to the load, electrical switch means responsive to a control signal for selectively electrically connecting said first means to said power socket to deliver electrical power to a load plugged into said socket, a manual rotary switch on a panel, and rate tier indicia on said panel adjacent to and associated with positions of said rotary switch for operator selection of a rate tier at which said power socket is to be disconnected from said first means, means for receiving utility power rate information from a utility supplier, means for comparing said utility power rate information to said rate tier selected at said rotary switch, and means responsive to said comparing means and coupled to said electrical switch means for supplying said control signal to said electrical switch means, and thereby selectively disconnecting said power socket from said first means when said rate information reaches or exceeds said selected tier and selectively connecting said power socket to said first means when said rate information is less than said selected tier.

2. The apparatus set forth in claim 1 wherein one position of said rotary switch and associated indicia are associated with continuous connection of said power socket to said first means independent of said rate information.

3. The apparatus set forth in claim 2 wherein said rate tier indicia is coordinated with a plurality of different rate tiers and associated positions of said rotary switch.

4. The apparatus set forth in claim 2 wherein said means for receiving utility power rate information is connected to said first means and adapted to receive said information over the utility power lines.

5. The apparatus set forth in claim 2 wherein said electrical switch means comprises a relay switch.

6. The apparatus set forth in claim 5 further comprising an enclosure having said rotary switch and said indicia on a flat face panel of said enclosure.

7. The apparatus set forth in claim 6 wherein said first means comprises a plug on said enclosure for receipt in a utility power outlet.

8. The apparatus set forth in claim 7 wherein said enclosure is of rectangular construction, having said rotary switch, said indicia and said socket on one face, and said power plug extending from another face.

9. The apparatus set forth in claim 2 further comprising means responsive to signals for overriding said selected tier and said comparing means, and connecting said power socket to said first means independent of said comparing means.

10. The apparatus set forth in claim 1 wherein said means for selectively disconnecting and connecting said power socket to said first means is adapted to disconnect and connect said power socket to said first means at random intervals after said rate information exceeds or is less than said selected tier.

11. The apparatus set forth in claim 1 further comprising means for monitoring voltage at said first means and disconnecting said second means from said first means when voltage at said first means is outside of a selected voltage range.

12. The apparatus set forth in claim 11 further comprising means for monitoring current and phase angle of power applied to said power socket, and means for computing power consumption as a function of said monitored voltage, current and phase angle.

13. The apparatus set forth in claim 12 further comprising means for computing energy consumption at said module.

14. The apparatus set forth in claim 13 further comprising means for transmitting information indicative of energy consumption to the utility supplier.

15. The apparatus set forth in claim 14 further comprising means for transmitting status information, including rate tier selected at said rotary switch, to the utility supplier.

16. The apparatus set forth in claim 12 further comprising means for calibrating voltage, current and phase angle measurements at said module.

* * * * *